United States Patent
Lu et al.

(10) Patent No.: US 12,185,172 B2
(45) Date of Patent: Dec. 31, 2024

(54) METHOD AND DEVICE FOR CONDITIONAL HANDOVER

(71) Applicant: GUANGDONG OPPO MOBILE TELECOMMUNICATIONS CORP., LTD., Guangdong (CN)

(72) Inventors: Qianxi Lu, Guangdong (CN); Xin You, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 347 days.

(21) Appl. No.: 17/481,083

(22) Filed: Sep. 21, 2021

(65) Prior Publication Data

US 2022/0007244 A1 Jan. 6, 2022

Related U.S. Application Data

(63) Continuation of application No. PCT/CN2019/095479, filed on Jul. 10, 2019.

(51) Int. Cl.
*H04W 36/00* (2009.01)
*H04W 36/08* (2009.01)
(Continued)

(52) U.S. Cl.
CPC ....... *H04W 36/0085* (2018.08); *H04W 36/08* (2013.01); *H04W 36/302* (2023.05); *H04W 36/362* (2023.05)

(58) Field of Classification Search
CPC .................................................. H04W 36/0085
See application file for complete search history.

(56) References Cited

U.S. PATENT DOCUMENTS 7,251,228 B2   7/2007  Knisely
11,375,392 B2 * 6/2022  Chen ..................... H04W 24/10
(Continued)

FOREIGN PATENT DOCUMENTS

CN    105704769 A    6/2016
CN    106535271 A    3/2017
(Continued)

OTHER PUBLICATIONS

First Office Action of the Japanese application No. 2021-573967, issued on May 19, 2023. 8 pages with English translation.
(Continued)

*Primary Examiner* — Guang W Li
(74) *Attorney, Agent, or Firm* — PERKINS COIE LLP

(57) ABSTRACT

A method for conditional handover, a terminal device and a network device are provided. The method includes that: CHO configuration information is received, where the CHO configuration information includes measurement configuration information of a source cell; CHO processing is performed according to the CHO configuration information. In the solution provided in the application, since the CHO configuration information received by the terminal device includes the measurement configuration information of the source cell, the terminal device may perform CHO related measurement by using the measurement configuration information of the source cell, so as to reduce the number of measurement parameters maintained by the terminal device and reduce the complexity of CHO.

11 Claims, 3 Drawing Sheets

(51) Int. Cl.
*H04W 36/30* (2009.01)
*H04W 36/36* (2009.01)

(56) References Cited

U.S. PATENT DOCUMENTS

| | | |
|---|---|---|
| 2001/0055969 A1 | 12/2001 | Bonta et al. |
| 2003/0169705 A1 | 9/2003 | Knisely |
| 2014/0126545 A1 | 5/2014 | Tamura et al. |
| 2016/0014666 A1 | 1/2016 | Müller et al. |
| 2019/0223073 A1* | 7/2019 | Chen ............... H04W 36/305 |
| 2021/0068016 A1* | 3/2021 | Shi ................... H04W 36/08 |
| 2021/0274404 A1* | 9/2021 | Koziol ............. H04W 36/0055 |
| 2021/0360495 A1* | 11/2021 | Lovlekar ......... H04W 36/00837 |
| 2021/0377831 A1* | 12/2021 | Yan ................. H04W 36/0077 |
| 2021/0410039 A1* | 12/2021 | Da Silva ........... H04W 36/0079 |
| 2022/0007244 A1* | 1/2022 | Lu .................... H04W 36/36 |
| 2022/0022121 A1* | 1/2022 | Eklöf et al. ........ H04W 36/322 |
| 2022/0070740 A1* | 3/2022 | Futaki .............. H04W 36/0061 |
| 2022/0150780 A1* | 5/2022 | Chen ................. H04W 36/365 |
| 2022/0217597 A1* | 7/2022 | Ishii ................. H04W 36/362 |
| 2023/0379787 A1* | 11/2023 | Han .................. H04W 36/362 |

FOREIGN PATENT DOCUMENTS

| | | |
|---|---|---|
| CN | 108882293 A | 11/2018 |
| JP | 2001169325 A | 6/2001 |
| JP | 2019091954 A | 6/2019 |
| KR | 20180118047 A | 10/2018 |
| RU | 2657249 C1 | 6/2018 |
| WO | 2018203716 A1 | 11/2018 |

OTHER PUBLICATIONS

Samsung, "Conditional HO, Basic signalling aspects", 3GPP TSG RAN WG2 #106, R2-1906763(Same as R2-1904386), May 13-17, 2019. 5 pages.
Ericsson, "Conditional handover failures in NR", 3GPP TSG RAN WG2#106, R2-1906215, May 13-17, 2019. 6 pages.
China Telecom, "Running CR for introduction of even further mobility enhancement in E-UTRAN", 3GPP TSG-RAN WG2 #106 R2-1907137, Reno, USA, May 13-17, 2019. 14 pages.
Ericsson, "Stage-2 aspects of Conditional Handover in LTE", 3GPP TSG RAN WG2 #106 R2-1906194, Reno, US, May 13-17, 2019. 5 pages.
ETRI, "Considerations on Conditional Handover", 3GPP TSG-RAN WG2 Meeting #103bis R2-1815244, Chengdu, China, Oct. 8-12, 2018. 6 pages.
First Office Action of the Chinese application No. 202110523076.2, issued on Apr. 2, 2022. 18 pages with English translation.
MediaTek Inc, "Discussions on LTE Conditional Handover Procedures", 3GPP TSG-RAN WG2 Meeting #106 R2-1906489, Reno, NV, USA, May 13-17, 2019. 6 pages.
Office Action of the Indian application No. 202117042678, issued on Mar. 23, 2022. 6 pages with English translation.
Supplementary European Search Report in the European application No. 19936911.7, mailed on Mar. 17, 2022. 12 pages.
Written Opinion of the International Search Authority in the international application No. PCT/CN2019/095479, mailed on Mar. 31, 2020. 8 pages with English translation.
ZTE Corporation et al, "Discussion on the configuration of CHO execution conditions", 3GPP TSG RAN WG2 Meeting #106 R2-1907108 (revision of R2-1904259), Reno, USA, May 13-17, 2019. 4 pages.
International Search Report in the international application No. PCT/CN2019/095479, mailed on Mar. 31, 2020.
First Office Action of the European application No. 19936911.7, issued on Dec. 12, 2022. 7 pages.
First Office Action of the Russian application No. 2021139335, issued on Nov. 16, 2022. 12 pages with English translation.
Huawei, Hisilicon, "Considerations on relations between CHO and legacy handover", 3GPP TSG-RAN WG2 Meeting #106 (R2-1907670), Reno, Nevada, USA, Mar. 5, 2019 (revision of R2-1904853 Nov. 16, 2022), 3 pages.
Huawei, Hisilicon, "Considerations on triggering and HO execution of CHO", 3GPP TSG-RAN WG2 Meeting #106(R2-1907667), Reno, Nevada, USA, Mar. 5, 2019 (revision of R2-1904854 Nov. 16, 2022), 3 pages.
Panasonic, "Discussion on the Conditions for CHO", 3GPP TSG RAN-WG2 Meeting#105bis (R2-1903377), Xi'an, China, Mar. 28, 2019, 3 pages.
First Office Action of the Vietnamese application No. 1-2021-08415, issued on Sep. 25, 2023. 3 pages with English translation.
First Office Action of the Korean application No. 10-2021-7040757, issued on Oct. 24, 2024. 12 pages with English translation.

* cited by examiner

400
| Receive CHO configuration information including measurement configuration information of a source cell | — S410 |
| Perform CHO processing according to the CHO configuration information | — S420 |
FIG. 4
500
| Send CHO configuration information including measurement configuration information of a source cell | — S510 |
FIG. 5
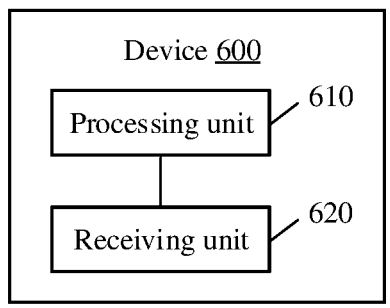
FIG. 6
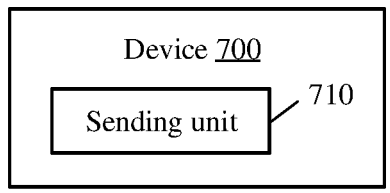
FIG. 7

METHOD AND DEVICE FOR CONDITIONAL HANDOVER

CROSS REFERENCE TO RELATED APPLICATION

This application is a continuation of International Patent Application No. PCT/CN2019/095479 filed on Jul. 10, 2019, the disclosure of which is hereby incorporated by reference in its entirety.

BACKGROUND

Due to the reasons such as adjustment of traffic load in wireless transmission, activation operation and maintenance, equipment failure or terminal-based mobility, etc., in order to ensure continuity of communication and quality of service, a communication system needs to transfer a communication link between the terminal device and an original cell to the new cell, that is, to perform the cell handover.

For high-speed mobile scenario and high-frequency deployment scenario, there are problems with frequent handover and handover prone to failure, and the 3rd generation partnership project (3GPP) plans to introduce a cell handover triggered based on conditions, namely conditional handover (CHO). The terminal device needs to perform measurement on a source cell and a target cell before performing CHO, and then determine whether to perform handover from the source cell to the target cell based on a measurement result and a pre-configured condition of a network device. How to configure the terminal device, which performs CHO, for cell measurement is a problem that needs to be solved at present.

SUMMARY

The disclosure relates to the communication field, and in particular, to a method and device for conditional handover, which may reduce the number of measurement parameters maintained by the terminal device and reduce the complexity of CHO.

According to a first aspect, there is provided a method for conditional handover, which includes that: CHO configuration information is received, the CHO configuration information including measurement configuration information of a source cell; and CHO processing is performed according to the CHO configuration information.

According to a second aspect, there is provided another method for conditional handover, which includes that: CHO configuration information is sent, the CHO configuration information including measurement configuration information of a source cell.

According to a third aspect, there is provided a CHO device for implementing the method in the first aspect above. Specifically, the device includes functional modules for implementing the method in the first aspect.

According to a fourth aspect, there is provided another CHO device for implementing the method in the second aspect above. Specifically, the device includes functional modules for implementing the method in the second aspect.

According to a fifth aspect, there is provided a CHO equipment, including a processor and a memory. The memory is configured to store a computer program, and the processor is configured to invoke and execute the computer program stored in the memory to implement the method in the first aspect above.

According to a sixth aspect, there is provided another CHO equipment, including a processor and a memory. The memory is configured to store a computer program, and the processor is configured to invoke and execute the computer program stored in the memory to implement the method in the second aspect above.

According to a seventh aspect, there is provided a chip for implementing the method in the first aspect above. Specifically, the chip includes a processor, configured to invoke and execute a computer program in a memory to cause a device equipped with the chip to implement the method in the first aspect above.

According to an eighth aspect, there is provided a chip for implementing the method in the second aspect above. Specifically, the chip includes a processor, configured to invoke and execute a computer program in a memory to cause a device equipped with the chip to implement the method in the second aspect above.

According to a ninth aspect, there is provided a computer-readable storage medium for storing a computer program that, causes a computer to implement the method in the first aspect above.

According to a tenth aspect, there is provided a computer-readable storage medium, for storing a computer program that, causes a computer to implement the method in the second aspect above.

According to a eleventh aspect, there is provided a computer program product, including: computer program instructions that cause a computer to implement the method in the first aspect above.

According to a twelfth aspect, there is provided a computer program product, including: computer program instructions that cause a computer to implement the method in the second aspect above.

According to a thirteenth aspect, there is provided a computer program that, when being executed on a computer, causes the computer to implement the method in the first aspect above.

According to a fourteenth aspect, there is provided a computer program that, when being executed by a computer, causes the computer to implement the method in the second aspect above.

In the solution provided in the application, since the CHO configuration information received by the terminal device includes measurement configuration information of a source cell, the terminal device may perform a CHO related measurement by using the measurement configuration information of the source cell, so as to reduce the number of measurement parameters maintained by the terminal device and reduce the complexity of CHO.

BRIEF DESCRIPTION OF THE DRAWINGS

FIG. 4 is a schematic diagram of a CHO method according to the application.

FIG. 5 is a schematic diagram of another CHO method according to the application.

FIG. 6 is a schematic diagram of a CHO device according to the application.

FIG. 7 is a schematic diagram of another CHO device according to the application.

DETAILED DESCRIPTION

The technical solution in the embodiments of the present application will be described below in conjunction with the drawings in the embodiments of the present application. Obviously, the described embodiments are part of the embodiments of the present application, not all of the embodiments. Based on the embodiments in the application, all other embodiments obtained by those of ordinary skill in the art without making creative work shall fall within the scope of protection in the application.

Figure 1:
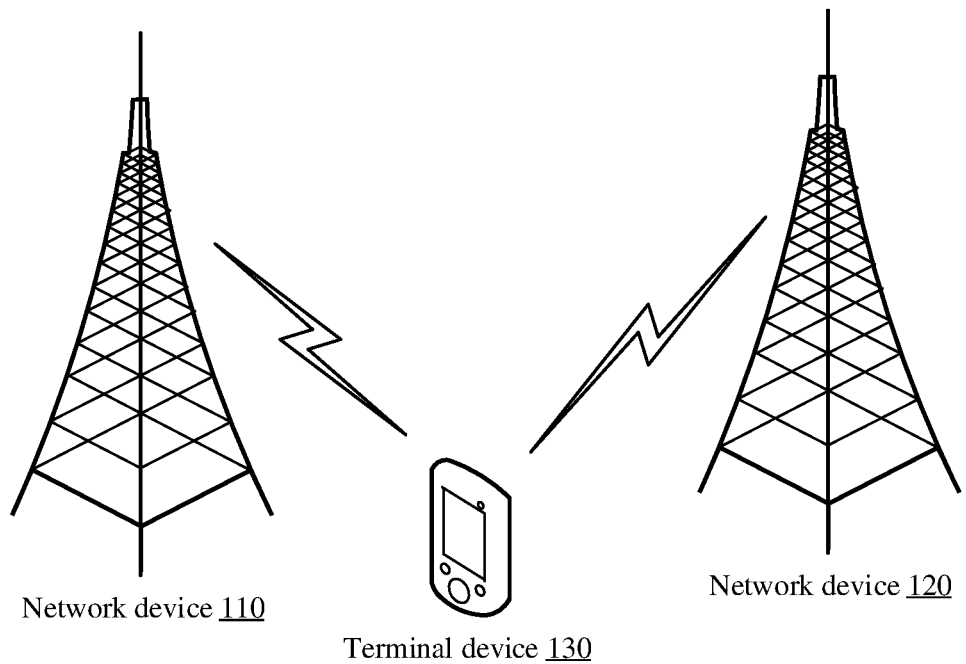
FIG. 1 is a schematic diagram of a communication system applied to the present application.

Firstly, the application scenario of the application is introduced. FIG. 1 is a schematic diagram of a communication system applied to the present application.

A communication system 100 includes a network device 110, a network device 120 and a terminal device 130. The terminal device 130 communicates with the network device 110 and/or network device 120 via electromagnetic waves.

In the present application, the terminal device 130 may include a variety of handheld devices with wireless communication capabilities, vehicle-mounted device, wearable device, computing device or other processing device connected to a wireless modem, such as a user equipment (UE), a mobile station (MS), a soft terminal, a home gateway and a set-top box, which all defined by the 3rd generation partnership project (3GPP).

The network device 110 may be a base station defined by 3GPP, such as a gNB in the 5th generation (5G) communication system. The network device 110 may also be a non-3GPP access network device, such as an access gateway (AGF). The network device 110 may also be a relay station, an access point, vehicle equipment, a wearable device, and other types of devices.

The network device 120 may be a base station defined by 3GPP, such as a gNB in 5G communication system. The network device 120 may also be a non-3GPP access network device, such as an AGF. The network device 120 may also be a relay station, an access point, an in-vehicle device, a wearable device, and other types of devices.

The communication system 100 is shown only by way of example. The communication system applicable to the application is not limited to this. For example, the number of network devices and terminal devices contained in the communication system 100 may be other quantities. For the sake of simplicity, the terminal device and the network device described below are no longer attached with reference numerals.

Figure 2:
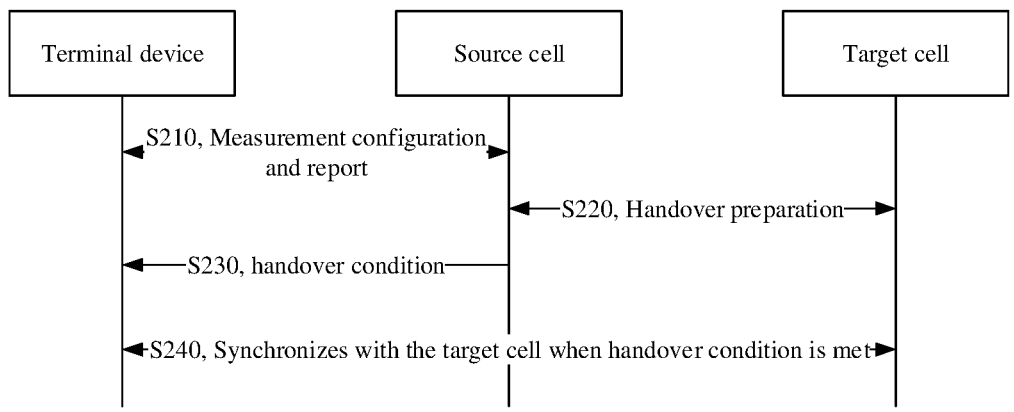
FIG. 2 is a schematic diagram of a CHO process according to the application.

FIG. 2 is a schematic diagram of a CHO process according to the application. The process includes the following operations.

In S210, measurement configuration and report are performed.

A network device sends measurement configuration information to the terminal device. The measurement configuration information indicates which measurement operations the terminal device needs to perform and how to report.

In S220, handover is prepared.

The terminal device detects a signal quality state of a neighboring cell according to the parameters such as a measurement object indicated by the measurement configuration information, and reports a measurement result to the network device, so as to facilitate handover of the network device or improve a relationship list of the neighboring cells.

In S230, the network device sends a handover condition to the terminal device.

The handover condition is, for example, that the measurement value enters a threshold and for a period of time. If the terminal device determines that the current measurement value meets the handover condition, the following handover operations are performed.

In S240, the terminal device synchronizes with the target cell when the handover condition is met.

For example, the target cell requests the access and mobility management function (AFM) and user plane function (UPF) respectively to perform path handover and release the UE context of the source base station, so that the synchronization between target cell and the terminal device is completed.

In the CHO process, the network device may send CHO configuration information to the terminal device via a radio resource control (RRC) reconfiguration message for the terminal device to perform CHO related processing, such as for the terminal device to perform CHO measurement. In some embodiments, the RRC reconfiguration message further includes a field carrying the measurement configuration information of the source cell. The measurement configuration information of the source cell carried by the field is used for the terminal device in the connected state to perform mobility measurement, such as a radio resource management (RRM) measurement.

Figure 3:
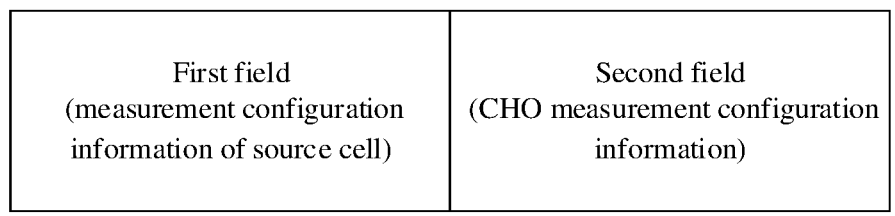
FIG. 3 is a schematic diagram of an RRC message according to the application.

As shown in FIG. 3, the RRC reconfiguration message includes a first field for carrying measurement configuration information of a source cell and a second field for carrying CHO measurement configuration information. Upon receiving the RRC reconfiguration message, the terminal device performs the RRM measurement and the CHO measurement according to the RRC reconfiguration message.

It should be noted that in the application, terms "first" and "second" are only used to indicate different individuals. For example, the first field and the second field indicate two different fields. Besides, there are no other limitations.

The method of conditional handover provided in the application is described in detail below.

As shown in FIG. 4, the method 400 includes the following operations.

In S410, CHO configuration information is received. The CHO configuration information includes measurement configuration information of a source cell.

The method 400 may be executed by a terminal device or a chip in the terminal device. The CHO configuration information is, for example, carried in the second field of the RRC reconfiguration message. The measurement configuration information of the source cell contained in the CHO configuration information is used by the terminal to perform CHO related processing such as intra-frequency or inter-frequency measurement, so as to determine whether to perform handover from the source cell to a target cell.

The measurement configuration information of the source cell contained in the CHO configuration information may be a measurement configuration identifier (ID), which, for example includes at least one of the following information of the source cell: a measurement object ID (MeasObjectId), a measurement report configuration ID (reportConfigId), or a measurement ID (MeasId).

The above IDs are used to indicate different measurement contents. The contents indicated by the above IDs are briefly described below. It should be understood that the contents indicated by each ID as described below are only examples and the application is not limited thereto.

1) Measurement Configuration ID

The measurement configuration ID is used to indicate a measurement object. The measurement object is a frequency point, such as an evolved universal terrestrial radio access (E-UTRA) carrier frequency. For a cell related to the carrier frequency, a network device may configure a list of cell offsets and a black list of cells, and the terminal device does not perform any operations on the cells in the black list in a measurement evaluation and a measurement report.

2) Report Configuration ID

The report configuration ID is used to indicate a report configuration. The report configuration may be divided into an event triggered report configuration, a periodical triggering report configuration, and a periodically event triggered report configuration. The details of these three configurations are described below. Measurement events included in the event triggered report configuration, for example, includes the following events.

Event A1: Serving cell becomes better than absolute threshold.
Event A2: Serving cell becomes worse than absolute threshold.
Event A3: Neighbour cell becomes amount of offset better than PCell/PSCell.
Event A4: Neighbour cell becomes better than absolute threshold.
Event A5: PCell/PSCell becomes worse than absolute threshold 1 and Neighbour/SCell becomes better than another absolute threshold 2.
Event A6: Neighbour cel becomes amount of offset better than SCell.
Event B1: Neighbour cel becomes better than absolute threshold.
Event B2: PCell becomes better than absolute threshold 1 and Neighbour becomes better than another absolute threshold 2.

3) Measurement ID

The measurement ID is used to indicate an association between measurement objects and report configurations. For example, the network device may configure a measurement object X to associate with the Event A1 and indicate the association to the terminal device through the MeasId1. When the measurement object X reaches a measurement opening threshold, the terminal device may start measuring the measurement object X according to the MeasId1, and report a measurement result to the network device according to the Event A1.

In addition to the identifiers indicating the foregoing contents, the CHO configuration information may also include other parameters of the source cell, such as measurement gap, measurement opening threshold, and velocity state parameters, etc.

Upon receiving the CHO configuration information containing the above information, the terminal device may perform the following operation.

In S420, CHO processing is performed according to the CHO configuration information.

For example, the terminal device may perform measurement according to the CHO configuration information, and determine whether to report based on the report configuration when the measurement result meets the trigger condition. If the measurement result meets the report conditions in the report configuration, the terminal device records the measurement result into a measurement report and sends the measurement report to the network device (source cell and/or target cell).

The report configuration may be divided into three types, including: the event triggered report configuration, the periodical triggered report configuration, and the periodically event triggered report configuration as described above. The event triggered report configuration includes a type of the event and a threshold, as well as a duration that the triggering condition is met (i.e., time to trigger). The periodical triggered report configuration includes a report period and a purpose of the periodic triggering.

Type 1: Event triggered report configuration.

If the measurement value corresponding to the event enters the threshold and for a period of time, the terminal device is triggered to send a measurement report. The event triggered report configuration includes the followings.

The report condition for triggering the terminal device to send the measurement report includes one event chose from "Event A1" to "Event A6", "Event B1" and "Event B2", as well as a threshold parameter corresponding to the event;
the number of report times is 1;
the terminal device ignores a report interval.

Type 2: Periodical triggered report configuration.

The terminal device performs measurement for the measurement object indicated in the CHO configuration information and sends the measurement report according to a predefined report period and report interval. The periodical triggered report configuration includes the followings.

Different report purposes correspond to different report periods. The report purposes includes "reportCGI" and "reportstrongestcell";
if a report purpose is "reportingCGI", the number of report times is equal to 1; and if a report purpose is "reportstrongestcell", the number of report times may be greater than 1;
after the terminal device has been configured with "reportCGI", a timer T321 may be started. In order for the network device (source cell) to obtain information required to construct a list of neighboring cells as soon as possible, if the terminal device has obtained contents required for reporting before the timer T321 expires, the terminal device may send the measurement report in advance and stop the timer T321.

Type 3: Periodically event triggered report configuration.

If the measurement value corresponding to the event enters the threshold and for a period of time, the terminal device is triggered to send a measurement report. When the report process is triggered, the terminal device will start a timer and a counter. The timer is used to count the interval between multiple measurements and the counter is used to count the number of measurements. The periodically event triggered report configuration includes the followings.

The report conditions for triggering the terminal device to send measurement report includes an event chose from "Event A1" to "Event A5", "Event B1" and "Event B2", as well as a threshold parameter corresponding to the event;
the number of report times is greater than 1;
if the report interval is valid, the terminal sets a timer of the report period according to a configured interval parameter.

Since the CHO configuration information received by the terminal device includes the measurement configuration information of the source cell, the terminal device can use the measurement configuration information of the source cell to perform CHO related measurement, so as to reduce the number of measurement parameters maintained by the terminal device and reduce the complexity of CHO.

During performing CHO processing, the terminal device may perform a CHO related measurement by using part or all of the measurement configuration information of the source cell, which will be described below respectively.

In a possible embodiment, the terminal device performs CHO related measurement by using all measurement configuration information of the source cell.

For example, the CHO configuration information received by the terminal device includes the measurement configuration ID of the source cell, the terminal device determines a measurement configuration parameter of the source cell according to the measurement configuration ID (for example, "Event" and the like as mentioned above is used as parameters for measurement configuration of the source cell), and performs measurements according to the measurement configuration parameter to obtain a measurement result. Then, the terminal device determines whether to perform cell handover according to a CHO execution condition and the measurement result. If the measurement result meets the CHO execution condition, the terminal device performs cell handover. If the measurement result does not meet the CHO execution condition, the terminal device does not perform cell handover.

The terminal device may obtain CHO execution condition through an RRC message. For example, when the network device sends CHO configuration information through an RRC reconfiguration message, the CHO execution condition is sent to the terminal device via the RRC reconfiguration message.

Since the CHO configuration information refers to all of the measurement configuration information of the source cell, the terminal device only needs to maintain one set of variables. Therefore, compared with the solution of maintaining two sets of variables (the measurement configuration parameter of the source cell and CHO measurement configuration parameter), the above solution of maintaining one set of variables enables to reduce the complexity of the terminal device to perform CHO.

The source may add or delete one or more candidate CHO cells so as to meet a requirement of CHO. When deleting the CHO candidate cells, it only needs to indicate an ID of the cell to be deleted in the CHO candidate cell list (ChoID). The measurement configuration information of the source cell is shown below.

```
-- ASN1START
-- TAG-MEAS-CONFIG-START
CHOConfig ::=                      SEQUENCE {
    choIdToRemoveList              ChoIdToRemoveList
OPTIONAL, -- Need N
    choIdToAddModList              ChoIdToAddModList
OPTIONAL, -- Need N
    }
    ChoIdToRemoveList ::=          SEQUENCE (SIZE
(1..maxNrofChoId)) OF ChoId
-- TAG-MEAS-CONFIG-STOP
-- ASN1STOP -- ASN1STOP
    The message structure of the ChoIdToAddModList cell is as follows.
    ChoIdToAddModList ::= SEQUENCE (SIZE (1..maxNrofChoId)) OF
ChoIdToAddMod
    ChoIdToAddMod ::=              SEQUENCE {
    choId                          ChoId,
    targetCellConfig               RRCReconfiguration,
    choCondition                   ChoCondition
    }
```

The source cell may modify or add a new CHO candidate cell (i.e., a candidate target cell) based on the ChoID. Herein, the targetCellConfig is a handover command generated by the target cell, the ChoCondition is the CHO execution condition. The message structure of the ChoCondition is as follows.

```
ChoCondition ::=                   SEQUENCE (SIZE
(1..maxNrofChoCondition)) OF MeasId
```

The source cell may configure for the terminal device a CHO execution condition containing a set of conditions through the sequence of MeasId. The MeasId refers to an existing measurement ID in the measurement configuration information of the source cell. In the solution, it is not required to define an additional measurement configuration in the CHO configuration information. If a MeasId, a MeasObjectId, or a reportConfigId related to CHO need to be added, it may be added to the measurement configuration information of the source cell.

As shown below, another message structure for the ChoCondition may be a list.

```
-- ASN1START
-- TAG-MEAS-CONFIG-START
ChoCondition ::=                   SEQUENCE {
    choConditionToRemoveList       MeasIdToRemoveList
OPTIONAL, -- Need N
    choConditionToAddModList       MeasIdToAddModList
OPTIONAL, -- Need N
    }
```

In another possible embodiment, the terminal device performs CHO related measurement by using part of the measurement configuration information of the source cell.

For example, the CHO configuration information received by the terminal device includes a measurement configuration ID, the measurement configuration ID has correspondence with a measurement configuration parameter of the source cell, and the measurement configuration ID has correspondence with a CHO measurement configuration parameter.

The terminal device determines the CHO measurement configuration parameter according to the measurement configuration ID, and performs measurements according to the CHO measurement configuration parameter to obtain a measurement result. Then, the terminal device determines whether to perform cell handover according to a CHO execution condition and the measurement result. If the measurement result meets the CHO execution condition, the terminal device performs cell handover. If the measurement result does not meet the CHO execution condition, the terminal device does not perform cell handover.

The terminal device may obtain the CHO execution condition through an RRC message. For example, when the network device sends CHO configuration information through an RRC reconfiguration message, the CHO execution condition is sent to the terminal device via the RRC reconfiguration message.

Since the CHO configuration information refers to part of the measurement configuration information of the source cell, the terminal device needs to maintain two sets of variables, that is, the measurement configuration parameter of the source cell and the CHO measurement configuration parameter. The terminal device may identify the CHO measurement configuration parameter using a prefix Cho. For example, the CHO measurement configuration parameter may be in the following form.

ChoMeasIdToAddModList;
ChoMeasObjectToAddModList;
ChoReportConfigToAddModList.

The CHO measurement configuration parameter received by the terminal device through the CHO configuration information may be stored in the list above. Taking the measurement configuration ID indicating the above mentioned event A3 as an example, for the two variables stored on the terminal device side, the measurement configuration parameter of the source cell is the offset (for example, 3 dB) and is stored in ReportConfigToAddModList. The CHO measurement configuration parameter is the offset (for example 5 dB) and is stored in ChoReportConfigToAddModList.

In the above solution, although the terminal device maintains two sets of variables, the network device indicates two measurement configuration parameters by using a single ID, which solves the problem of tight ID space.

In the above solution, the two sets of variables maintained by the terminal device each contains three variables, namely, a CHO measurement ID and a measurement ID of the source cell, a CHO measurement object and a measurement object of the source cell, and a CHO report configuration and a report configuration of the source cell. In an embodiment, the two sets of variables maintained by the terminal device may also include the following variables.

Option 1: the CHO measurement ID and the measurement ID of the source cell, the CHO report configuration and the report configuration of the source cell, as well as a measurement object. The measurement object is a common variable shared by the measurement configuration of the source cell and the CHO measurement configuration.

Option 2: the CHO measurement object and the measurement object of the source cell, the CHO report configuration and the report configuration of the source cell, as well as a measurement ID. The measurement ID is a common variable shared by the measurement configuration of the source cell and the CHO measurement configuration.

Option 3: the CHO measurement ID and the measurement ID of the source cell, the CHO measurement object and the measurement object of the source cell, as well as a report configuration. The report configuration is a common variable shared by the measurement configuration of the source cell and the CHO measurement configuration.

Option 4: the CHO measurement ID and the measurement ID of the source cell, a report configuration, as well as a measurement object. The report configuration and the measurement object are common variables shared by the measurement configuration of the source cell and the CHO measurement configuration.

Option 5: the CHO report configuration and the report configuration of the source cell, a measurement ID, as well as a measurement object. The measurement ID and the measurement object are common variables shared by the measurement configuration of the source cell and the CHO measurement configuration.

Option 6: the CHO measurement object and the measurement object of the source cell, a report configuration, as well as a measurement ID. The report configuration and the measurement ID are common variables shared by the measurement configuration of the source cell and the CHO measurement configuration.

One or more candidate CHO cells may be added, modified or deleted by the source cell to meet the requirement of CHO. When deleting a CHO candidate cell, it only needs to indicate the identity of the cell to be deleted in the CHO candidate cell list (ChoID). The content of the measurement configuration information for the source cell is shown below.

```
-- ASN1START
-- TAG-MEAS-CONFIG-START
CHOConfig ::=                    SEQUENCE {
choIdToRemoveList                ChoIdToRemoveList
    OPTIONAL, -- Need N
choIdToAddModList                ChoIdToAddModList
    OPTIONAL, -- Need N
measObjectToRemoveList           MeasObjectToRemoveList
    OPTIONAL, -- Need N
measObjectToAddModList           MeasObjectToAddModList
    OPTIONAL, -- Need N
reportConfigToRemoveList         ReportConfigToRemoveList
    OPTIONAL, -- Need N
reportConfigToAddModList         ReportConfigToAddModList
    OPTIONAL, -- Need N
measIdToRemoveList               MeasIdToRemoveList
    OPTIONAL, -- Need N
measIdToAddModList               MeasIdToAddModList
    OPTIONAL, -- Need N
    ...
}
ChoIdToRemoveList ::=            SEQUENCE (SIZE (1..maxNrofChoId)) OF
ChoId
-- TAG-MEAS-CONFIG-STOP
-- ASN1STOP
```

The message structure of the ChoIdToAddModList cell is as follows.

```
ChoIdToAddModList ::=     SEQUENCE (SIZE (1..maxNrofChoId)) OF
ChoIdToAddMod
    ChoIdToAddMod ::=     SEQUENCE {
    choId                 ChoId,
    targetCellConfig      RRCReconfiguration,
    choCondition          ChoCondition
    }
```

Based on the ChoID, the source cell may modify or add a new CHO candidate cell, i.e., a candidate target cell. The targetCellConfig is the handover command generated by the target cell and the ChoCondition is the CHO execution condition. The message structure of the ChoCondition is as follows.

```
ChoCondition ::=                SEQUENCE (SIZE
(1..maxNrofChoCondition)) OF MeasId
```

The source cell may configure for the terminal device CHO execution conditions containing a set of conditions through the sequence of MeasId. The MeasId is used to indicate CHO execution condition. If the variables maintained by the terminal device include the CHO measurement ID, the MeasId in the ChoCondition above indicates the CHO measurement ID. If the variables maintained by the terminal device do not include the CHO measurement ID, then the MeasId in the ChoCondition described above refers to the measurement ID of the source cell.

The MeasId in the ChoCondition may also correlate the CHO measurement object with the CHO report configuration. If the variables maintained by the terminal device do not include the CHO measurement object and the CHO report configuration, then the MeasId in the ChoCondition correlates the measurement object with the report configuration of the source cell.

As shown below, another message structure for the ChoCondition may be a list.

```
-- ASN1START
-- TAG-MEAS-CONFIG-START
ChoCondition ::=              SEQUENCE {
choConditionToRemoveList      MeasIdToRemoveList
OPTIONAL, -- Need N
choConditionToAddModList      MeasIdToAddModList
OPTIONAL, -- Need N
}
```

The above describes in detail the method for conditional handover provided by the application from the perspective of the terminal device. The following will describe the method of conditional handover provided by the application from the perspective of the network device.

As shown in FIG. 5, the method 500 includes the following operations.

In S510, CHO configuration information is sent, the CHO configuration information including measurement configuration information of a source cell.

The method 500 may be executed by a network device or a chip in the network device, and the playing role of the network device is not limited in the application. That is, the network device may be a network device corresponding to the source cell or a network device corresponding to a target cell.

Since the CHO configuration information sent by the network device includes the measurement configuration information of the source cell, the terminal device may use the measurement configuration information of the source cell to perform CHO related measurement, so that the number of measurement parameters maintained by the terminal device is reduced, and thus the complexity of CHO is reduced.

In an embodiment, the measurement configuration information of the source cell includes a measurement configuration ID of the source cell.

In an embodiment, the measurement configuration ID includes at least one of a measurement ID, a measurement object ID, or a measurement report configuration ID of the source cell.

In an embodiment, the measurement configuration information of the source cell includes a measurement configuration ID. The measurement configuration ID has correspondence with a measurement configuration parameter of the source cell, and the measurement configuration ID has correspondence with a CHO measurement configuration parameter.

In an embodiment, the CHO measurement configuration parameter comprises at least one of:
a CHO measurement ID;
a CHO measurement object; or
a CHO measurement report configuration.

In an embodiment, the measurement configuration information further includes CHO measurement configuration parameter modification information, which is used to modify the measurement configuration parameter of the source cell corresponding to the measurement configuration ID by a terminal device.

In an embodiment, the measurement configuration information further includes CHO measurement configuration parameter addition information, which is used to add the measurement configuration parameter of the source cell corresponding to the measurement configuration ID by a terminal device.

In an embodiment, the measurement configuration information further includes CHO measurement configuration parameter deletion information, which is used to delete the measurement configuration parameter of the source cell corresponding to the measurement configuration ID by a terminal device.

In an embodiment, the CHO configuration information is carried in an RRC reconfiguration message.

The specific manners of performing CHO by the network device and the technical effects produced therefrom may refer to the embodiments corresponding to FIG. 2 to FIG. 4, which will not elaborated herein for simplicity.

Examples of the CHO method provided in the application are described in detail above. It is to be understood that a CHO device contains hardware structures and/or software modules corresponding to each function in order to perform the above functions. Persons skilled in the art are easy to aware that the various exemplary units and algorithm steps described in combination with the embodiments disclosed herein may be implemented as hardware, or a combination of computer software and hardware. Whether to implement a certain function in hardware or in a form of computer software driving hardware depends on the specific applications and design constraints of the technical solution. Professional technicians may adopt different methods to realize the described functions in each specific application, which, however, should be considered as falling within the scope of the present invention.

The application may divide the CHO device into functional units according to the above method examples. For example, each function may be divided into functional units, or two or more functions may be integrated into one processing unit. The integrated units mentioned above may be realized in the form of hardware or software functional units. It should be noted that the division of units in the application is schematic and is only a logical function division, and there may be another division method in the actual implementation.

FIG. 6 is a schematic diagram of a CHO device according to the application. The device 600 includes a processing unit 610 and a receiving unit 620. The processing unit 610 is capable of controlling the receiving unit 620 to perform receiving steps.

The receiving unit 620 is configured to receive CHO configuration information, the CHO configuration information including measurement configuration information of a source cell.

The processing unit is configured to perform CHO processing according to the CHO configuration information.

In an embodiment, the measurement configuration information of the source cell includes a measurement configuration ID of the source cell. The processing unit 610 is further configured to:
  determine a measurement configuration parameter of the source cell according to the measurement configuration ID of the source cell;
  perform measurement according to the measurement configuration parameter of the source cell; and
  perform or not perform cell handover according to a CHO execution condition and a measurement result.

In an embodiment, the measurement configuration ID includes at least one of a measurement ID, a measurement object ID, or a measurement report configuration ID of the source cell.

In an embodiment, the measurement configuration information of the source cell includes a measurement configuration ID, the measurement configuration ID has correspondence with a measurement configuration parameter of the source cell, and the measurement configuration ID has correspondence with a CHO measurement configuration parameter. The processing unit 610 is further configured to:
  determine the CHO measurement configuration parameter according to the measurement configuration ID;
  perform measurement according to the CHO measurement configuration parameter; and
  perform or not perform cell handover according to a CHO execution condition and a measurement result.

In an embodiment, the CHO measurement configuration parameter includes at least one of:
  a CHO measurement ID, a CHO measurement object, or a CHO measurement report configuration.

In an embodiment, the measurement configuration information further includes CHO measurement configuration parameter modification information.

The processing unit 610 is further configured to: modify the measurement configuration parameter of the source cell corresponding to the measurement configuration ID according to the CHO measurement configuration parameter modification information, and obtain the CHO measurement configuration parameter.

In an embodiment, the measurement configuration information further includes CHO measurement configuration parameter addition information.

The processing unit 610 is further configured to: add the CHO measurement configuration parameter corresponding to the measurement configuration ID according to the CHO measurement configuration parameter addition information.

In an embodiment, the measurement configuration information further includes CHO measurement configuration parameter deletion information.

The processing unit 610 is further configured to: delete the CHO measurement configuration parameter corresponding to the measurement configuration ID according to the CHO measurement configuration parameter deletion information.

In an embodiment, the CHO configuration information is carried in an RRC reconfiguration message.

FIG. 7 is a schematic diagram of a CHO device provided in the application. The device 700 includes a sending unit 710.

The sending unit 710 is configured to send CHO configuration information, the CHO configuration information including measurement configuration information of a source cell.

In an embodiment, the measurement configuration information of the source cell includes a measurement configuration ID of the source cell.

In an embodiment, the measurement configuration ID includes at least one of a measurement ID, a measurement object ID, or a measurement report configuration ID of the source cell.

In an embodiment, the measurement configuration information of the source cell includes a measurement configuration ID, the measurement configuration ID has correspondence with a measurement configuration parameter of the source cell, and the measurement configuration ID has correspondence with a CHO measurement configuration parameter.

In an embodiment, the CHO measurement configuration parameter includes at least one of:
  a CHO measurement ID, a CHO measurement object, or a CHO measurement report configuration.

In an embodiment, the measurement configuration information further includes CHO measurement configuration parameter modification information, which is used to modify the measurement configuration parameter of the source cell corresponding to the measurement configuration ID by a terminal device.

In an embodiment, the measurement configuration information further includes CHO measurement configuration parameter addition information, which is used to add the measurement configuration parameter of the source cell corresponding to the measurement configuration ID by a terminal device.

In an embodiment, the measurement configuration information further includes CHO measurement configuration parameter deletion information, which is used to delete the measurement configuration parameter of the source cell corresponding to the measurement configuration ID by a terminal device.

In an embodiment, the CHO configuration information is carried in an RRC reconfiguration message.

Figure 8:
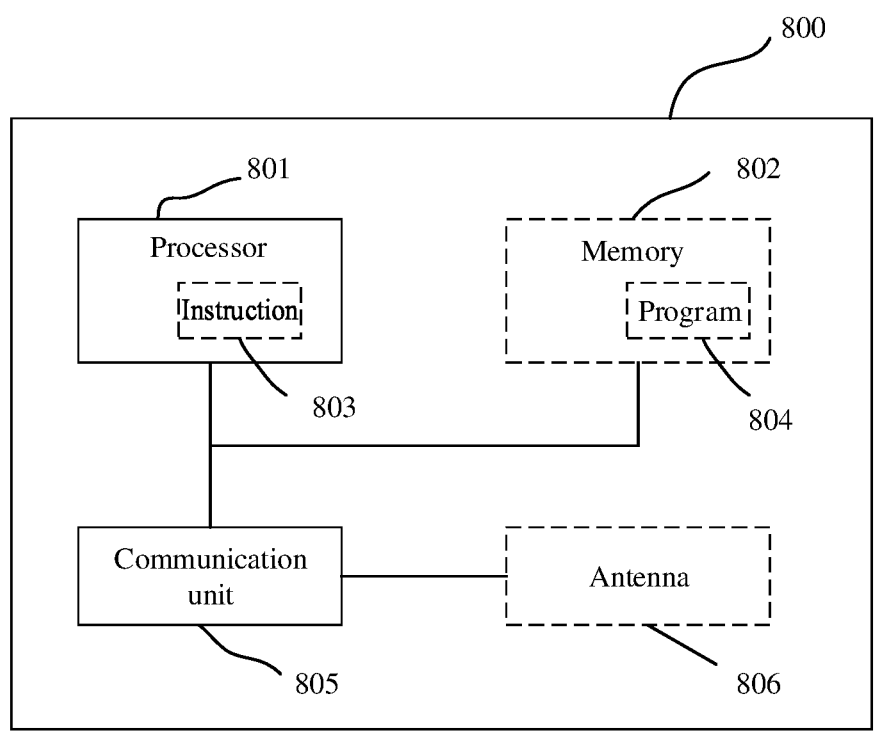
FIG. 8 is a schematic diagram of CHO equipment according to the application.

FIG. 8 is a schematic diagram of a CHO equipment according to the application. The dotted line in FIG. 8 indicates that the unit or module is optional. The device 800 may be configured to implement the method described in the above method embodiments. The device 800 may be a terminal device or a network device or a chip.

The device 800 includes one or more processors 801 that support the device 800 to implement the method in the corresponding method embodiments shown in FIG. 2 to FIG. 5. A processor 801 may be a generalized processor or a dedicated processor. For example, the processor 801 may be a central processing unit (CPU). The CPU may be configured to control the device 800 to execute software programs and process data from software programs. The device 800 may also include a communication unit 805 configured to implement the input (receiving) and output (sending) of the signal.

For example, the device 800 may be a chip, and the communication unit 805 may be the input and/or output circuit of the chip or the communication unit 805 may be the communication interface of the chip. The chip may be an integral part of the terminal device or the network device or other wireless communication device.

For another example, a device 800 may be a terminal device or a network device, and the communication unit 805 may be a transceiver of the terminal device or the network device, or the communication unit 805 may be a transceiver circuit of the terminal device or the network device.

The device 800 may include one or more memories 802, having stored thereon a program 804, which may be execute by the processor 801 to generate instruction 803 and cause processor 801 to execute the method described in the above method embodiments in accordance with instruction 803. In some embodiments, the memory 802 may also store data. In some embodiments, the processor 801 may also read data stored in the memory 802, where the data may be stored at the same or different storage address as the program 804.

The processor 801 and the memory 802 may be set separately or integrated together, for example, integrated on a single board of the network device or on a system on chip (SOC) of the terminal device.

The device 800 may also include an antenna 806. The communication unit 805 is configured to realize the transceiver function of the device 800 through the antenna 806.

The specific implementations that the processor 801 performs the CHO method may refer to the related description in the method embodiments.

It should be understood that the steps of the above method embodiments may be completed by a logical circuit in the form of hardware or instructions in the form of software in the processor 801. The processor 801 may be a CPU, a digital signal processor (DSP), an application specific integrated circuit (ASIC), a field programmable gate array (FPGA), or other programmable logic device, such as a discrete gate, a transistor logic device, or a discrete hardware component.

The application also provides a computer program product that, when being executed by processor 801, implements the method described in any of the method embodiments in the application.

The computer program product may be stored in the memory 802, such as the program 804. The program 804 is finally converted into an executable object file that may be executed by the processor 801 through preprocessing, compilation, assembly, and linking.

The application also provides a computer-readable storage medium on which a computer program is stored, and the computer program, when being executed by a computer, causes to implement the method described in any method embodiment in the application. The computer program may be a high-level language program or an executable object program.

The computer-readable storage medium is, for example, the memory 802. The memory 802 may be a volatile or non-volatile memory, or the memory 802 may include both volatile and non-volatile memory. The non-volatile memory may be a read-only memory (ROM), a programmable ROM (PROM), an erasable PTOM (EPROM), an electrically EPROM (EEPROM), or flash memory. The volatile memory may be a random access memory (RAM), which acts as an external cache. By way of example, not limitation, many forms of RAM is available, such as a static RAM (SRAM) and a dynamic RAM (DRAM), a synchronous DRAM (SDRAM), a double data rate SDRAM (DDR SDRAM), an enhanced SDRAM (ESDRAM), a synchlink DRAM (SL-DRAM) and a direct rambus RAM (DR RAM).

The skilled in the art may clearly understand that, for the convenience and conciseness of description, the specific working process and technical effects of the device and equipment described above may refer to the corresponding process and technical effects in the foregoing method embodiments, and are not repeatedly described.

In some embodiments provided in the application, the disclosed system, device and method may be realized by other ways. For example, some characteristics of the method embodiments described above may be ignored or not implemented. The embodiment of the device described above is only schematic, the division of the unit is only a logical function division, there may be other divisions in actual implementation, multiple units or components may be combined or integrated into another system. In addition, the coupling between units or components may be direct or indirect, including electrical, mechanical, or other forms of connection.

It should be understood that in the various embodiments of the application, the ordinal number of the processes does not imply the sequence of execution, and the sequence of execution of the processes should be determined by their functions and inherent logic, and should not constitute any limitation to the process of execution of the embodiments of the application.

In addition, the terms "system" and "network" herein are often used interchangeably. It should be understood that term "and/or" in the disclosure is only an association relationship for describing associated objects and represents that three relationships may exist. For example, A and/or B may represent three conditions: i.e., independent existence of A, existence of both A and B and independent existence of B. In addition, the character "/" in the disclosure usually represents that previous and next associated objects form an "or" relationship.

In conclusion, the above are only preferred embodiments of the technical solution of the application and are not intended to limit the scope of protection of the application. Any modifications, equivalent replacements, improvements, etc., made within the spirit and principle of this application should be included in the protection scope of the application.

The invention claimed is:

1. A method for conditional handover (CHO), comprising:
  receiving CHO configuration information and measurement configuration information of a source cell;
  performing CHO processing according to the CHO configuration information,
  wherein the measurement configuration information of the source cell comprises a measurement configuration identification (ID) of the source cell; and
  wherein performing CHO processing according to the CHO configuration information comprises:
  determining a measurement configuration parameter of the source cell corresponding to the measurement configuration ID of the source cell;
  performing a measurement according to the measurement configuration parameter of the source cell to obtain a measurement result; and
  performing or not performing cell handover according to a CHO execution condition in the CHO configuration information corresponding to the measurement configuration ID and the measurement result,
  wherein the measurement configuration ID of the source cell has a correspondence with a CHO measurement configuration parameter, and wherein performing the measurement according to the measurement configuration parameter of the source cell to obtain the measurement result comprises:
determining the CHO measurement configuration parameter according to the measurement configuration ID of the source cell; and
performing measurement according to the CHO measurement configuration parameter.

2. The method of claim 1, wherein the measurement configuration ID of the source cell comprises at least one of a measurement ID, a measurement object ID, or a measurement report configuration ID of the source cell.

3. The method of claim 1, wherein the CHO measurement configuration parameter comprises at least one of:
a CHO measurement ID, a CHO measurement object, or a CHO measurement report configuration.

4. The method of claim 1, wherein the CHO configuration information is carried in a radio resource control (RRC) reconfiguration message.

5. A terminal device, comprising: a processor, and a memory for storing instructions executed by the processor, wherein the processor is configured to:
receive conditional handover (CHO) configuration information and measurement configuration information of a source cell;
perform CHO processing according to the CHO configuration information,
wherein the measurement configuration information of the source cell comprises a measurement configuration identification (ID) of the source cell; and
wherein the processor is configured to:
determine a measurement configuration parameter of the source cell corresponding to the measurement configuration ID of the source cell;
perform a measurement according to the measurement configuration parameter of the source cell to obtain a measurement result; and
perform or not perform cell handover according to a CHO execution condition in the CHO configuration information corresponding to the measurement configuration ID and the measurement result,
wherein the measurement configuration ID of the source cell has a correspondence with a CHO measurement configuration parameter, and wherein the processor is configured to:
determine the CHO measurement configuration parameter according to the measurement configuration ID of the source cell; and
perform measurement according to the CHO measurement configuration parameter.

6. The terminal device of claim 5, wherein the measurement configuration ID of the source cell comprises at least one of a measurement ID, a measurement object ID, or a measurement report configuration ID of the source cell.

7. The terminal device of claim 5, wherein the CHO measurement configuration parameter comprises at least one of:
a CHO measurement ID, a CHO measurement object, or a CHO measurement report configuration.

8. The terminal device of claim 5, wherein the CHO configuration information is carried in a radio resource control (RRC) reconfiguration message.

9. A network device, comprising: a processor, and a memory for storing instructions executed by the processor, wherein the processor is configured to:
send conditional handover (CHO) configuration information, and measurement configuration information of a source cell,
wherein the measurement configuration information of the source cell comprises a measurement configuration identification (ID) of the source cell; and
wherein the measurement configuration ID has a correspondence with a measurement configuration parameter of the source cell, and the measurement configuration ID has a correspondence with the CHO configuration information,
wherein the measurement configuration ID of the source cell has a correspondence with a CHO measurement configuration parameter.

10. The network device of claim 9, wherein the measurement configuration ID of the source cell comprises at least one of a measurement ID, a measurement object ID, or a measurement report configuration ID of the source cell.

11. The network device of claim 9, wherein the CHO measurement configuration parameter comprises at least one of:
a CHO measurement ID, a CHO measurement object, or a CHO measurement report configuration.

* * * * *